United States Patent [19]

Meisel, Jr.

[11] 4,128,277

[45] Dec. 5, 1978

[54] LATERAL STIFFENER FOR TRACK SHOES

[75] Inventor: Thomas C. Meisel, Jr., Peoria, Ill.

[73] Assignee: Caterpillar Tractor Co., Peoria, Ill.

[21] Appl. No.: 802,614

[22] Filed: Jun. 2, 1977

[51] Int. Cl.$^2$ ............................................. B62D 55/28
[52] U.S. Cl. ......................................... 305/54; 305/57
[58] Field of Search .................. 305/54, 57, 35 R, 38,
305/39, 53, 55, 41, 42; 74/247

[56] References Cited

U.S. PATENT DOCUMENTS

| 3,165,364 | 1/1965 | Hardman et al. | 305/54 X |
| 3,537,760 | 11/1970 | Kimura et al. | 305/54 |
| 3,578,824 | 5/1971 | Woodward | 305/54 |
| 4,014,581 | 3/1977 | Groff | 305/54 |

Primary Examiner—Robert B. Reeves
Assistant Examiner—John P. Shannon
Attorney, Agent, or Firm—Phillips, Moore, Weissenberger, Lempio & Majestic

[57] ABSTRACT

An endless track for a tractor or the like comprises a pair of laterally spaced link assemblies attached to a plurality of track shoes. In a first embodiment of this invention, a single stiffener extends laterally across each track shoe and is releasably attached to a pair of laterally spaced links of the link assemblies and to one of the track shoes by common bolts. In a second embodiment, a pair of stiffeners are each releasably secured to one of the links and to the track shoe.

13 Claims, 6 Drawing Figures

LATERAL STIFFENER FOR TRACK SHOES

BACKGROUND OF THE INVENTION

The use of wide and/or flat track shoes employed in the endless track assemblies of track-type tractors and the like requires that the track shoes be fabricated of a heavy-duty and stiff construction to resist bending. Such track shoes tend to induce severe torsional loading on the track links employed in the endless track assemblies. The torsional loading could give rise to bushing bore wallowing, pin drift and seal displacement.

SUMMARY OF THIS INVENTION

The present invention is directed to overcoming one or more of the problems as set forth above.

The track assembly of this invention comprises a pair of laterally spaced link assemblies each comprising a plurality of pivotally interconnected links and a track shoe disposed on each pair of laterally spaced links of the link assemblies. At least one stiffening means extends laterally across the track shoe and is releasably secured thereto by fastening means, each of which extends through each of the links.

BRIEF DESCRIPTION OF THE DRAWINGS

Other objects of this invention will become apparent from the following description and accompanying drawings wherein.

DETAILED DESCRIPTION

Figure 1:
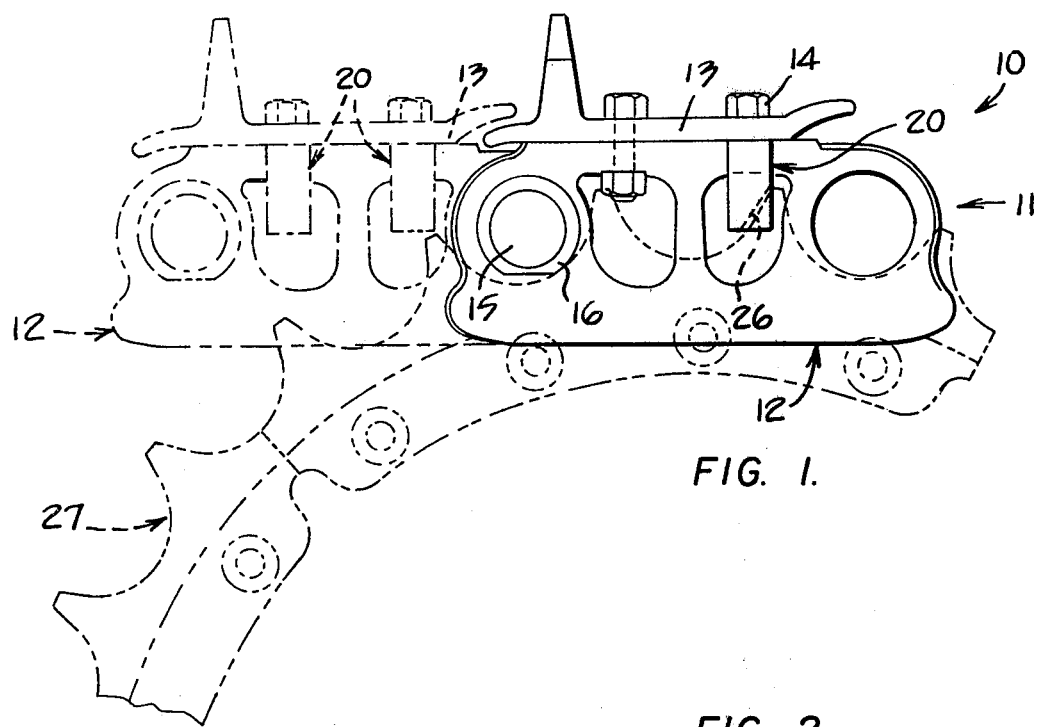
FIG. 1 is a side elevational view of a partially illustrated endless track assembly and a drive sprocket, shown in phantom lines, operatively engaged therewith.
Figure 2:
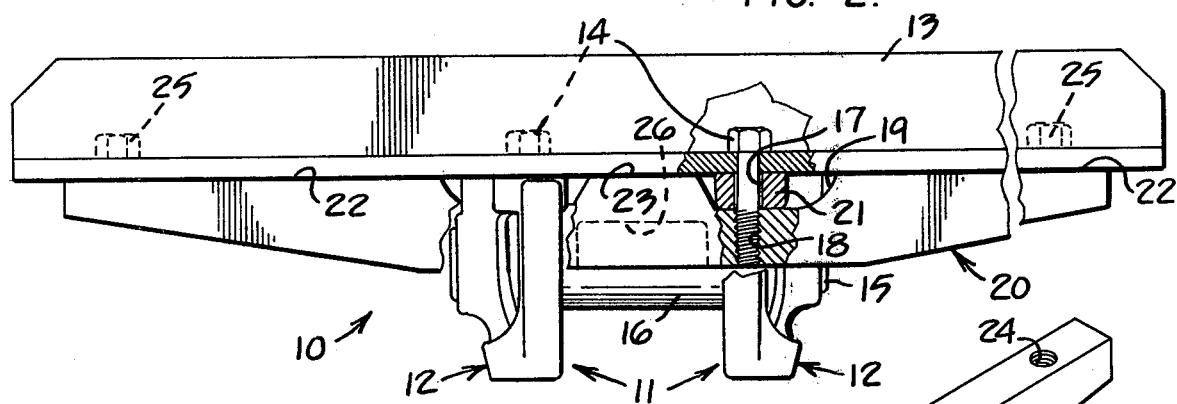
FIG. 2 is an end elevational view of a portion of the track assembly, more clearly illustrating a stiffening means of this invention employed therein.

FIGS. 1 and 2 illustrate an endless track assembly 10 comprising a pair of laterally spaced and articulated link assemblies 11 each comprising a plurality of pivotally interconnected links 12. A substantially flat and wide track shoe 13 is disposed on a laterally spaced pair of links 12 and is secured to each link by releasable fastening means, such as a bolt 14. Each link is pivotally connected to an adjacent link in a conventional manner by means of a pin 15 and a cylindrical bushing 16.

Each bolt 14 extends through a bore 17, formed in link 12, and threadably engages a threaded bore 18 formed within a notch 19 defined on the upper side of a single stiffening means or member 20. As shown in FIG. 1, a pair of members 20 could be employed for each track shoe 13, if so desired. The member extends substantially the full width of the track shoe and is disposed substantially inwardly from outer edges defining the length thereof to have a width substantially less than the length of the track shoe. Alternatively, the threaded bore could constitute a through bore and a nut could be threadably mounted on bolt 14 to constitute the fastening means.

As clearly shown in FIGS. 1 and 2, notch 19 accommodates a bridging portion 21 of a respective track link 12 and thus functions to clamp the closely fitted track link to shoe 13. As more clearly shown in FIG. 3, the upper side of member 20 comprises a pair of outer flat portions 22 formed on opposite ends thereof and an intermediate flat portion 23. Flat portions 22 and 23 are disposed in the same plane and abut the flat inner surface of the track shoe in bearing relationship.

Outboard ends of member 20 have threaded bores 24 formed therein, each adapted to receive a bolt 25 for securing the member to the track shoe directly. A chamfered surface 26 defines a recess on one side of the member and intermediate the ends thereof, beneath flat portion 23. Such recess, as shown in FIG. 1, is adapted to provide a clearance for accommodating the teeth of a sprocket 27, adapted to drive track assembly 10 via pins 15 and bushings 16.

Figure 3:
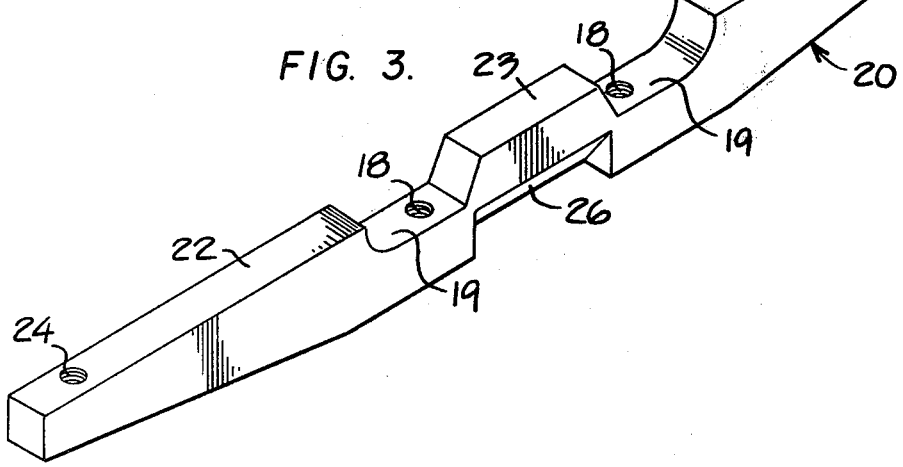
FIG. 3 is an isometric view of the stiffening means.
Figure 4:
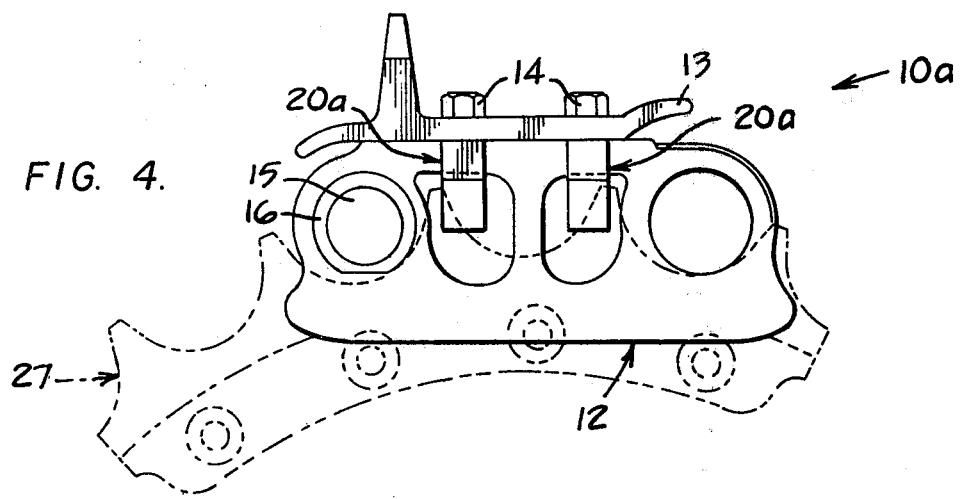
FIG. 4 is a view similar to FIG. 1, but illustrating a modification of the stiffening means employed in the endless track assembly.
Figure 5:
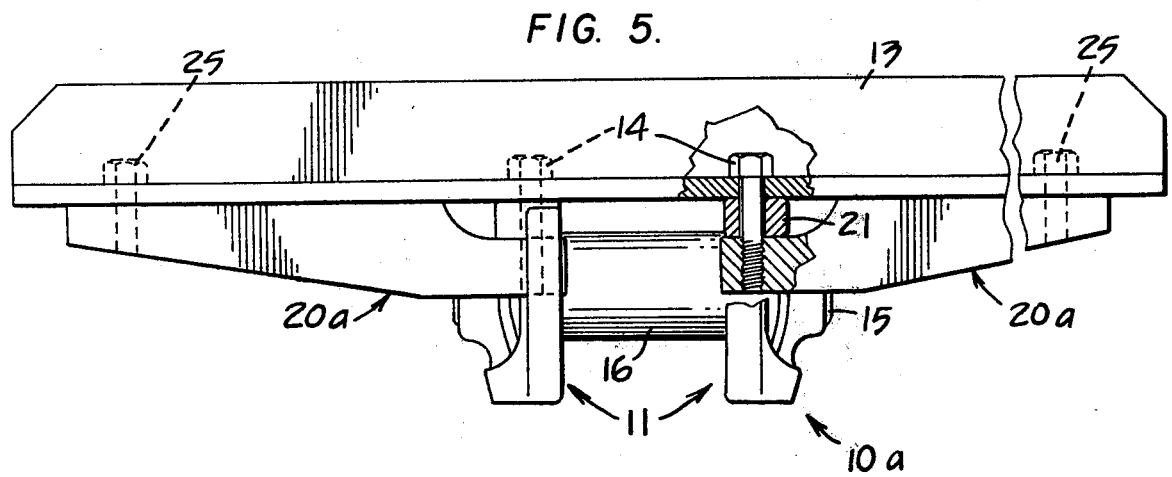
FIG. 5 is a view similar to FIG. 2, illustrating the modified stiffening means.
Figure 6:
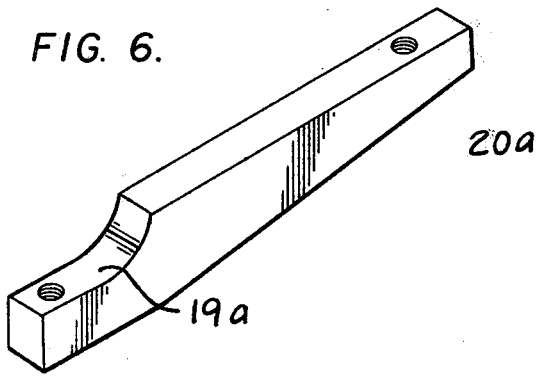
FIG. 6 is an isometric view of one part of the modified stiffening means.

FIGS. 4–6 illustrate a modified track assembly 10a wherein identical numerals depict corresponding constructions, but with numerals depicting modified constructions being accompanied by an "a." The latter track assembly essentially differs from the FIGS. 1–3 track assembly in that the stiffening means comprises a pair of laterally spaced and aligned members 20a, i.e., flat bridging portion 23 of the FIG. 3 stiffening member 20 has been eliminated. Each stiffening member 20a is secured to track shoe 13 by a fastening means or bolt 14 in the manner described above. A cut-out 19a is formed on an inner end of each member to accommodate clamped bridging portion 21 of a respective track link 12.

The embodiments of the invention in which an exclusive property or privilege is claimed are defined as follows:

1. A track assembly comprising
   a pair of laterally spaced and articulated link assemblies each comprising a plurality of pivotally interconnected links,
   a track shoe disposed on a laterally spaced pair of links of said link assemblies,
   at least one stiffening means extending across said track shoe,
   releasable fastening means extending through said track shoe and through each of said pair of links and releasably secured to said stiffening means for releasably securing said track shoe, links and stiffening means together, and
   means defining a pair of longitudinally spaced notches in said stiffening means, each of said notches having a bridging portion of a respective one of said pair of links accommodated therein and maintained in clamped relationship between said stiffening means and said track shoe by said fastening means.

2. The track assembly of claim 1 wherein said track shoe is substantially flat and said stiffening means comprises flat surface portions formed thereon and abutting said track shoe in bearing relationship.

3. The track assembly of claim 1 wherein said fastening means comprises a bolt extending through aligned bores formed through said track shoe and the bridging portion of each of said pair of links and threadably mounted in said stiffening means.

4. The track assembly of claim 3 wherein said fastening means further comprises another bolt threadably attaching each outboard end of said track shoe to said stiffening means directly.

5. The track assembly of claim 1 wherein said stiffening means comprises a single elongated member extending substantially the full width of said track shoe.

6. The track assembly of claim 5 wherein said track shoe is substantially flat and wherein said member has a pair of outer flat surface portions formed on opposite ends thereof and an intermediate flat surface portion disposed between said outer flat surface portions and wherein all of said flat surface portions are maintained in bearing contact with said track shoe.

7. The endless track assembly of claim 6 further comprising means defining a notch between each of said outer flat surface portions and said intermediate flat surface portion and wherein the bridging portion of each of said pair of links is disposed in said notch and clamped between said track shoe and said member.

8. The endless track assembly of claim 5 further comprising means defining a recess on one side of said member intermediate the ends thereof for providing a clearance for teeth of a sprocket when said track assembly is driven thereby.

9. The track assembly of claim 1 wherein said stiffening means comprises a pair of laterally spaced members.

10. The track assembly of claim 9 wherein each of said members has means defining a notch on an inner end thereof and wherein the bridging portion of a respective one of said pair of links is disposed in said notch and is clamped between said track shoe and said member.

11. A track assembly comprising:
a pair of laterally spaced and articulated link assemblies each comprising a plurality of pivotally interconnected links,
a track shoe disposed on a laterally spaced pair of links of said link assemblies,
at least one stiffening means comprising a single elongated member extending substantially the full width of said track shoe for increasing the stiffness of said track shoe extending across said track shoe in the direction of its width and disposed substantially inwardly from outer edges of said track shoe defining the length thereof to have a width substantially less than the length of said track shoe,
releasable fastening means extending through said track shoe and through each of said pair of links and releasably secured to said stiffening means for releasably securing said track shoe, links and stiffening means together, and
means defining a recess on one side of said member intermediate the ends thereof adapted to provide a clearance for teeth of a sprocket when said track assembly is driven thereby.

12. A track assembly comprising
a pair of laterally spaced and articulated link assemblies each comprising a plurality of pivotally interconnected links,
a track shoe disposed on a laterally spaced pair of links of said link assemblies,
at least one stiffening member extending at least substantially across the full width of said track shoe, said track shoe being substantially flat, said stiffening member having a pair of outer flat surface portions formed on opposite ends thereof and an intermediate flat surface portion disposed between said outer flat surface portions and wherein all of said flat surface portions are maintained in bearing contact with said track shoe,
means defining a notch between each of said outer flat surface portions and said intermediate flat surface portion and wherein each of said pair of links comprises a bridging portion disposed in said notch and clamped between said track shoe and said member, and
releasable fastening means extending through said track shoe and through each pair of links and releasably secured to said stiffening means for releasably securing said track shoe, links and stiffening means together.

13. A track assembly comprising
a pair of laterally spaced and articulated link assemblies each comprising a plurality of pivotally interconnected links,
a track shoe disposed on a laterally spaced pair of links of said link assemblies,
a pair of laterally spaced stiffening members extending across said track shoe and wherein each of said members has means defining a notch on an inner end thereof and wherein a bridging portion of a respective one of said pair of links is disposed in said notch and is clamped between said track shoe and said member, and
releasable fastening means extending through said track shoe and through each of said pair of links and releasably secured to said stiffening members for releasably securing said track shoe, links and stiffening members together.

* * * * *